United States Patent [19]

Sudo et al.

[11] 4,414,460

[45] Nov. 8, 1983

[54] METHOD OF SEALING A TUBE USING A LASER BEAM

[75] Inventors: Shigeru Sudo, Tokyo; Masaaki Yada, Kawasaki, both of Japan

[73] Assignee: Tokyo Shibaura Denki Kabushiki Kaisha, Kawasaki, Japan

[21] Appl. No.: 329,436

[22] Filed: Dec. 10, 1981

[30] Foreign Application Priority Data

Dec. 26, 1980 [JP] Japan ............................. 55-185829

[51] Int. Cl.³ .............................................. B23K 27/00
[52] U.S. Cl. ........................ 219/121 LD; 219/121 LE; 219/121 FS
[58] Field of Search ..... 219/121 L, 121 LM, 121 LC, 219/121 LD, 121 LE, 121 LF, 121 FS; 313/315, 318; 65/36, 40, 138, 153, 155

[56] References Cited

U.S. PATENT DOCUMENTS 3,275,879  9/1966  Demarest et al. ............. 313/318 X
3,876,409  4/1975  Sangermano et al. ................ 65/40
4,220,462  9/1980  Frazier ................................ 65/153

FOREIGN PATENT DOCUMENTS 50-37913  12/1975  Japan .
53-70582   6/1978  Japan .
1298397   11/1972  United Kingdom .

*Primary Examiner*—C. L. Albritton
*Attorney, Agent, or Firm*—Oblon, Fisher, Spivak, McClelland & Maier

[57] ABSTRACT

A method of sealing an aperture formed in a discharge tube using a laser beam.

A tube having the aperture to be hermetically sealed is placed in a vessel having a window which transmits a laser beam. The aperture is covered with a blockade member. The blockade member is irradiated with the laser beam in order to melt the blockade member and seal the aperture.

6 Claims, 1 Drawing Figure

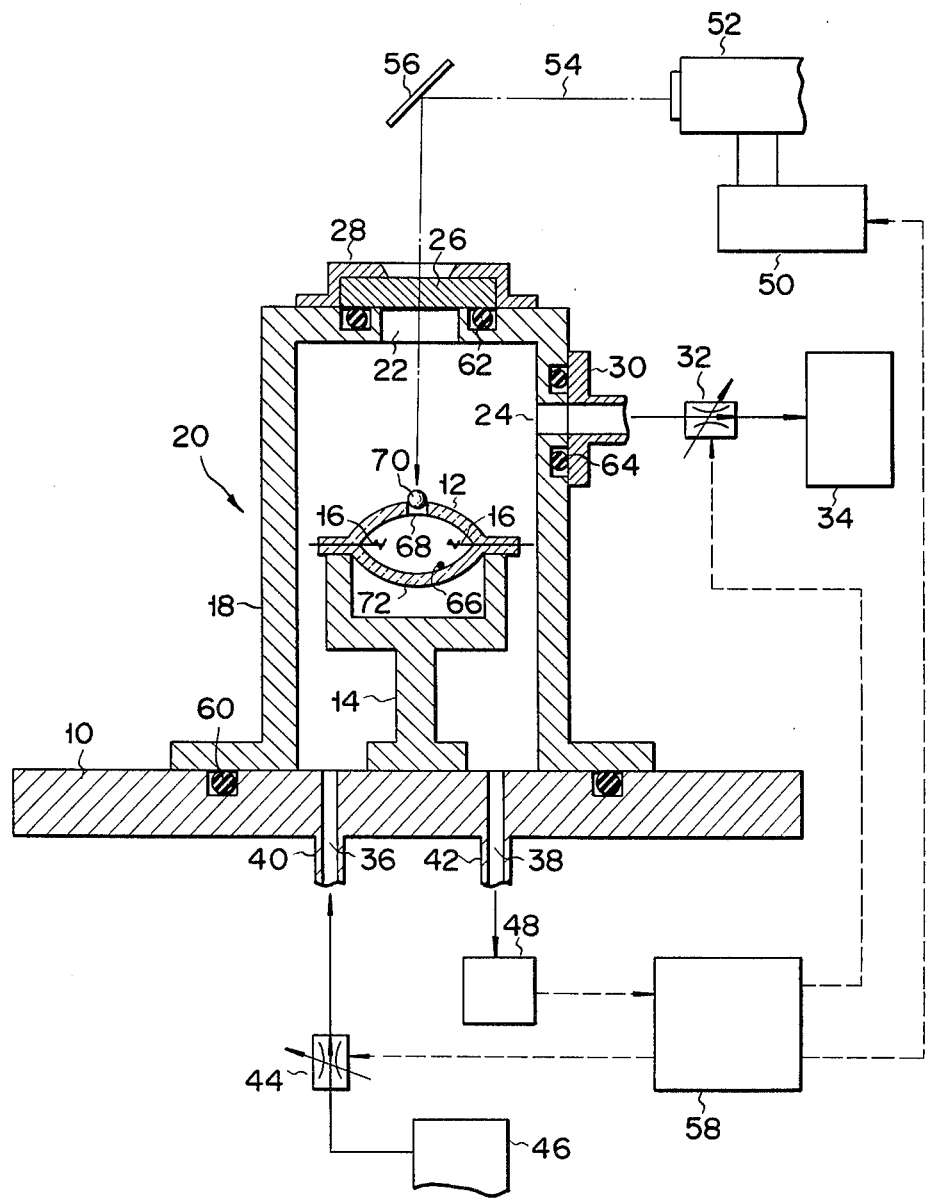

METHOD OF SEALING A TUBE USING A LASER BEAM

BACKGROUND OF THE INVENTION

The present invention relates to a method of sealing a tube using a laser beam.

Certain types of articles, for example, discharge lamps, are hermetically sealed after charging the interior with various substances. As is well known, a discharge lamp has a discharge tube for radiating light, which is made of a transparent material such as quartz glass. The discharge tube for radiating light consists of electrodes arranged at the both ends thereof, an inert gas of a predetermined purity and a predetermined pressure necessary to start discharge, and a light-emitting material. The discharge lamp of this type is manufactured by a method comprising the steps of forming an exhaust aperture at part of the discharge tube having electrodes at both ends, evacuating the discharge tube through the exhaust aperture, introducing a predetermined inert gas and light-emitting material, and hermetically sealing the exhaust aperture.

As a method for hermetically sealing the exhaust aperture, a method which uses a laser beam is known as disclosed in, for example, Japanese Patent Publication (KOKOKU) No. 37913/75, British Patent Publication No. 1,298,397, and Japanese Patent Publication (KOKAI) No. 70582/78. This method comprises the steps of introducing a light-emitting material in a discharge tube having an exhaust aperture, setting the discharge tube inside a closed vessel, charging the closed vessel with a gas to be sealed in the discharge tube, and irradiating part of the discharge tube surrounding the exhaust aperture with a laser beam to melt this part and to seal the exhaust aperture.

This sealing method has many advantages, such as simple steps.

However, the sealing method using the conventional laser beam also has disadvantages to be described below, and improvements are desired. With the conventional method, the laser beam irradiates the opposing tube wall of the discharge tube through the exhaust aperture. Therefore, an impurity gas is introduced into the discharge tube. If the tube wall is excessively heated, it deforms. With a discharge lamp, especially with a high pressure discharge lamp, the starting voltage, the life of the discharge lamp, and other characteristics largely depend upon the purity of the gas inside the discharge tube. If the tube wall is deformed, the mechanical strength of the discharge tube may be reduced and the discharge characteristics may be degraded. If the shape of the discharge tube varies from one discharge tube to another, the mechanical strength and discharge characteristics also vary from one discharge tube to another. Especially with a discharge lamp of high efficiency and small size which has recently been developed, the variations in the shape of the discharge tube after sealing extremely adversely affect the discharge characteristics, the color temperature, the color rendering properties, and the luminous efficacy of a source. Therefore, a method for sealing a discharge tube is desired with which the discharge tube is not deformed.

SUMMARY OF THE INVENTION

It is an object of the present invention to provide a method of sealing a tube using a laser beam and, more particularly, a method of sealing a discharge tube using a laser beam, which prevents introduction of an impurity gas inside the discharge tube and deformation of the discharge tube.

In order to achieve this object, there is provided according to the present invention a method of sealing a tube using a laser beam, comprising arranging a blockade member to cover an aperture formed in the tube, and irradiating the blockade member with a laser beam to melt the blockade member, thereby sealing the aperture.

According to the method of the present invention, the laser beam is not directly incident on the opposing part of the discharge tube through the aperture, and the wall of the discharge tube is not excessively heated. Therefore, the amount of an impurity gas introduced to the interior of the discharge tube is reduced, and deformation of the tube wall does not occur.

If a gas flow in a vessel in which the discharge tube is arranged while the blockade member is heated and melted by a laser beam, the impurity gas which is evolved by the blockade member may be effectively removed.

If the blockade member is shaped so as to fit in the aperture formed in the discharge tube, the dropping of the blockade member by thermal shock upon irradiation with the laser beam may be prevented.

BRIEF DESCRIPTION OF THE DRAWING

Other objects and advantages of the invention will become apparent from the following detailed description when taken in conjunction with the accompanying drawing, in which:

The drawing is a schematic view for explaining a method of sealing a tube using a laser beam according to the present invention.

DETAILED DESCRIPTION OF THE PREFERRED EMBODIMENTS

The drawing shows a device for explaining a sealing method of the present invention. A holder 14 for holding a workpiece, for example, a discharge tube 12 of quartz is fixed on the top surface of a base 10. A pair of electrodes 16 are arranged at the ends of the discharge tube 12. An inverted cylindrical cover 18 with a bottom is arranged on the top surface of the base 10 to cover the holder 14. The cover 18 and the base 10 constitutes a vessel 20.

A window 22 is formed in the bottom wall of the cover 18, and an opening 24 is formed in the side wall of the cover 18. A laser beam transmitting member 26 is arranged outside the window 22 and is fixed to the cover by a fixing member 28. The opening 24 is connected to a vacuum pump 34 through a flange 30 and a flow control valve 32 which is controlled by a stepper motor. The vacuum pump 34 comprises a turbomolecular pump which can operate within a wide range of pressure.

The base 10 has a supply aperture 36 and an aperture 38 for detection of pressure, to which are connected a supply duct 40 and a tube 42, respectively. The supply duct 40 is connected to a gas source 46 of a gas of high purity through a flow control valve 44 which is controlled by a stepper motor. The gas source 46 supplies the gas which is to be sealed in the discharge tube 12. The tube 42 is connected to a pressure gauge 48. Obliquely above the cover 18 is arranged a carbon dioxide laser 52 driven by a power supply 50. A laser beam 54 radiated from the laser 52 is reflected by a mirror 56, and the reflected beam is directed through the laser beam transmitting member 26 to a predetermined portion of the discharge tube 12 arranged inside the vessel 20.

The opening of the flow control valves 32 and 44, and the operation timing and the output voltage of the power supply 50 are controlled by control signals from a controller 58. The controller 58 controls the flow control valves 32 and 44 and the power supply 50 according to output signal of the pressure gauge 48 and a preset program. Reference numerals 60, 62 and 64 denote O-rings for hermetic sealing. The discharge tube 12 has an aperture 68 to be closed for sealing in a light-emitting material 66 such as mercury and a starting gas. This aperture 68 also serves as an exhaust aperture of the discharge tube 12. A blockade member 70 which is a quartz ball is arranged over the aperture 68.

A method of sealing the aperture 68 of the discharge tube 12 will now be described.

A certain amount of the light-emitting material 66 is introduced through the aperture 68 into the discharge tube 12 inside a dry box (not shown). The blockade member 70 comprising, for example, a quartz ball is placed over the aperture 68. The discharge tube 12 on which is placed the blockade member 70 is taken out of the dry box and is set on the holder 14 so that the blockade member 70 faces upward. The cover 18 is immediately placed thereover. The flange 30 connected to the already-operating vacuum pump 34 is connected to the opening 24 of the cover 18 to evacuate the vessel 20. During this process, the flow control valve 32 is completely open, and the flow control valve 44 is completely closed. The blockade member 70 prevents the introduction of air inside the discharge tube 12 through the aperture 68 while the discharge tube 12 is taken out of the dry box and set on the holder 14, and evacuation is initiated. When the vessel 20 is evacuated and the pressure therein decreases, atmospheric pressure is exerted on the cover 18 and the flange 30. Therefore, the cover 18 and the flange 30 are urged toward the base 10 and the cover 18, respectively. As a result, the vessel 20 can be automatically sealed, so that the cover 18 and the flange 30 need not be fixed to the base 10 and the cover 18, respectively, with bolts.

The pressure in the vessel 20 is detected by the pressure gauge 48. The detected value is supplied to the controller 58. When the pressure in the vessel 20 reaches a predetermined value, the controller 58 generates a control signal for closing the flow control valve 32 a little and also generates another control signal for opening the flow control valve 44. Consequently, Ar gas, for example, is supplied to the vessel 20 from the gas source 46. Then, the pressure inside the vessel 20 is set to a pressure equal to the final filling pressure inside the discharge tube 12. Under this condition, gas of high purity, for example, Ar, flows from the gas source 46 to the vacuum pump 34 through the flow control valve 44, the vessel 20, and the flow control valve 32.

When the controller 58 detects that the gas pressure in the vessel 20 has reached a predetermined value, the controller 58 then supplies to the power supply 50 a control signal for operating the laser 52. The laser beam 54 radiated by the laser 52 is reflected by the mirror 56, and the reflected beam 54 is radiated on the blockade member 70 through the laser beam transmitting member 26. Therefore, the blockade member 70 is heated, and impurity gas is evolved from blockade member 70 and the discharge tube 12. However, the evolved impurity gas is exhausted to the outside by the gas flow inside the vessel 20. The impurity gas evolved inside the discharge tube 12 is exhausted by diffusion inside the vessel through the gap between the blockade member 70 and the aperture 68.

Since the blockade member 70 is continuously irradiated with the laser beam, the blockade member 70 melts when it reaches the melting point. As a result, the discharge tube 12 and the blockade member 70 are coupled, and the aperture 68 is hermetically sealed.

The controller 58 then supplies to the power supply 50 a control signal for turning off the laser 52. After a predetermined period of time elapses, the controller 58 supplies to the flow control valves 32 and 44 a control signal for making the Ar pressure inside the vessel 20 equal to the atmospheric pressure. After the coupling part, that is, the sealing part between the discharge tube 12 and the blockade member 70 is hardened, the controller 58 supplies to the flow control valve 44 a control signal for turning off the flow control valve. Then, the cover 18 is moved so that the sealed discharge tube 12 is taken out.

With the method as described above, the blockade member 70 is irradiated with the laser beam 54. Since the blockade member 70 covers the aperture 68, a wall 72 of the discharge tube 12 opposing the aperture 68 is not directly irradiated with the laser beam. Since an excessive temperature rise of the wall 72 can be prevented, evolution of the impurity gas from the wall 72 may be prevented. The softening and deformation of the wall 72 may also be prevented.

Since the blockade member 70 comprises a quartz ball, it may stably cover the aperture 68. Therefore, dropping of the blockade member 70 due to thermal shock upon irradiation by the laser beam 70 may be prevented. When the discharge tube 12 is moved from the dry box to the vessel 20, the blockade member 70 does not drop from the aperture 68.

In the embodiment described above, while the blockade member 70 is irradiated with the laser beam 54, Ar gas of high purity is continuously supplied to the vessel 20 from the gas source 46. Accordingly the impurity gas evolved in the vessel 20 upon irradiation with the laser beam is exhausted to the outside of the vessel 20 through the opening 24 due to a flow of Ar gas. However, this Ar gas flow need not necessarily be performed.

When the discharge tube 12 is sealed with the blockade member 70, the sealing part, in general, is not formed in a constant shape. The shape of the sealing part varies from one discharge tube to another. Especially with a small discharge lamp, the shape of the sealing part has great effects on the lamp characteristics.

In order to solve this problem, a step to be described below may be added. When the blockade member 70 melts so that the aperture 68 is closed thereby, the controller 58 supplies to the power supply 50 a control signal for reducing to half the output from the laser 52. Simultaneously with this, the controller 58 supplies to the flow control valve 32 a control signal for temporarily closing the flow control valve 32. The time required for melting the blockade member 70 and closing the aperture 68 is experimentally determined in advance. The experimental result is preset in a timer, and the operating timing of the controller 58 is controlled by the timer.

When the flow control valve 32 is temporarily closed, the pressure inside the vessel 20 becomes higher than the internal pressure of the discharge tube 12. Therefore, the sealing part which is irradiated with the laser beam and melted thereby is pressed by the pressure inside the vessel and is recessed. Then, the controller 58 supplies to the flow control valve 32 a control signal for slightly opening the flow control valve 32. As a result, the internal pressure of the vessel 20 becomes lower than the internal pressure of the discharge tube 12, and the sealing part projects slightly outward. This operation is repeated several times. In this manner, the thickness of the sealing member is gradually made uniform.

With the method as described above, since the shape of the discharge tube 12 may be made uniform, lamps with uniform characteristics may be manufactured. The product value of the lamps may be increased due to the desirable appearance obtained by the uniform sealing part.

The present invention is not limited to the embodiments described above. The pressure inside the vessel and the control program for the gas flow rate may be suitably selected. When the irradiation with the laser beam is started, the vessel may be evacuated and placed under a desired pressure immediately before the blockade member melts. The blockade member may be irradiated with the laser beam through a lens. The blockade member need not be spherical. Instead of introducing the light-emitting material into the discharge tube inside the dry box, the material may be charged into the discharge tube inside the vessel. The vessel may be placed in the dry box or serve also as a dry box.

What we claim is:

1. In a method of sealing a tube, comprising the steps of placing a tube having an aperture to be hermetically sealed inside a vessel having a window which transmits a laser beam, filling the vessel with a gas or gases of predetermined kinds at a predetermined filling gas pressure and irradiating said tube near said aperture with the laser beam for sealing said aperture, the improvement which comprises the steps of:

covering said aperture with a blockage member; and irradiating said blockade member with the laser beam, while forming a gas stream within the vessel with said gas pressure maintained, to melt said blockade member and to seal said aperture.

2. A method according to claim 1, wherein said blockade member is shaped so as to fit in said aperture.

3. A method according to claim 2, wherein said blockade member is spherical.

4. A method according to claim 1, further comprising the step of reducing and increasing a gas pressure in said vessel while said blockade member is melted, to make the shape of a sealing part uniform.

5. A method according to claim 4, wherein said blockade member is shaped so as to fit in said aperture.

6. A method according to claim 5, wherein said blockade member is spherical.

* * * * *